United States Patent
Qi et al.

(10) Patent No.: US 9,261,656 B2
(45) Date of Patent: Feb. 16, 2016

(54) OPTICAL TRANSCEIVER INTERFACE WITH FLAT SURFACE LENS AND FLAT SURFACE INTERFACES

(75) Inventors: Qi Qi, Campbell, CA (US); Jamyuen Ko, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,471

(22) PCT Filed: Nov. 23, 2011

(86) PCT No.: PCT/US2011/062105
§ 371 (c)(1),
(2), (4) Date: Jun. 18, 2013

(87) PCT Pub. No.: WO2013/077880
PCT Pub. Date: May 30, 2013

(65) Prior Publication Data
US 2013/0272666 A1    Oct. 17, 2013

(51) Int. Cl.
*G02B 6/36* (2006.01)
*G02B 6/38* (2006.01)
*G02B 6/32* (2006.01)

(52) U.S. Cl.
CPC .............. *G02B 6/3853* (2013.01); *G02B 6/32* (2013.01); *G02B 6/38* (2013.01); *G02B 6/3839* (2013.01); *G02B 6/3821* (2013.01)

(58) Field of Classification Search
None
See application file for complete search history.

(56) References Cited

U.S. PATENT DOCUMENTS

| | | | | |
|---|---|---|---|---|
| 4,268,112 A * | 5/1981 | Peterson | | 385/61 |
| 4,730,891 A * | 3/1988 | Poorman | | 385/74 |
| 5,163,107 A * | 11/1992 | Garriss | | 385/74 |
| 5,333,225 A * | 7/1994 | Jacobowitz et al. | | 385/93 |
| 2002/0081066 A1* | 6/2002 | Brun et al. | | 385/34 |
| 2004/0032669 A1 | 2/2004 | Trotter, Jr. | | |
| 2004/0175073 A1* | 9/2004 | Grinderslev et al. | | 385/34 |
| 2006/0072878 A1* | 4/2006 | Dames et al. | | 385/47 |
| 2008/0193082 A1* | 8/2008 | Hamada | | 385/33 |
| 2010/0027943 A1* | 2/2010 | Armani et al. | | 385/74 |
| 2011/0229077 A1* | 9/2011 | Fortusini et al. | | 385/33 |
| 2011/0229083 A1 | 9/2011 | Dainese Junior et al. | | |
| 2012/0155807 A1* | 6/2012 | Knapp | | 385/61 |
| 2012/0321249 A1* | 12/2012 | DeMeritt et al. | | 385/34 |

FOREIGN PATENT DOCUMENTS

| | | |
|---|---|---|
| JP | 01-054406 | 3/1989 |
| JP | 05-333232 | 12/1993 |

OTHER PUBLICATIONS

International Search Report and Written Opinion from PCT/US2011/062105 mailed Jun. 1, 2012, 10 pages.
(Continued)

*Primary Examiner* — Mike Stahl
(74) *Attorney, Agent, or Firm* — Blakely, Sokoloff, Taylor & Zafman LLP (57) ABSTRACT

An optical lens connector includes a flat lens and substantially flat alignment surfaces. A lens body has a planar surface, and an optical lens is disposed in the lens body. The lens is a GRIN lens with a flat optical surface through which a light signal is propagated. The flat surface of the optical lens and the connector face enables the lens to be cleaned, and can reduce degradation due to contamination. The lens body can be housed in a sleeve as a rail guide to provide alignment of the lens with a mating connector lens.

12 Claims, 6 Drawing Sheets

(56) References Cited

OTHER PUBLICATIONS

Office Action from foreign counterpart Taiwan Patent Application No. 101142216 mailed Aug. 27, 2014, 12 pages.

International Preliminary Report on Patentability for International Application No. PCT/US2011/062105, mailed Jun. 5, 2014, 6 pages.
Grant from related Taiwan Application No. 101142216, granted May 26, 2015, including allowed claims in English. 5 pages total.

* cited by examiner

OPTICAL TRANSCEIVER INTERFACE WITH FLAT SURFACE LENS AND FLAT SURFACE INTERFACES

This application is a U.S. National Phase application under 35 U.S.C. §371 of, and claims priority to, International Application No. PCT/US11/62105 filed Nov. 23, 2011.

FIELD

Embodiments of the invention are generally related to optical interconnects, and more particularly to an optical interconnect lens with flat surfaces.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2011, Intel Corporation, All Rights Reserved.

BACKGROUND

Current computing platform architectures encompass many different interfaces to connect one device to another device. The interfaces provide I/O (input/output) for computing devices and peripherals, and may use a variety of protocols and standards to provide the I/O. The differing interfaces may also use different hardware structures to provide the interface. For example, current computer systems typically include multiple ports with corresponding connection interfaces, as implemented by physical connectors and plugs at the ends of the cables connecting the devices. Common connector types can include a Universal Serial Bus (USB) subsystem with a number of associated USB plug interfaces, DisplayPort, MiniDisplayPort (MDP), High Definition Multimedia Interface (HDMI), Firewire (as set forth in IEEE 1394), or other type.

There is a drive for increased throughput to exchange more information more quickly between devices. While optical signals are known to have high bandwidth data transfer, implementing optical signal interconnecting introduces challenges in the small form factors and plug-and-unplug environments of computing devices. Additionally, issues related to form factor or backwards compatibility with existing devices may reduce the ability to use optical signals in existing architectures. Furthermore, optical signals may degrade due to repeated use causing loosening of connectors, which negatively affects alignment and therefore signal quality. Additionally, optical signals are exchanged via optical lenses, which are subject to contamination (e.g., dust), which can also degrade signal quality. Thus, optical signal transfer may degrade by normal use of a connector and corresponding receptacle, reducing the effectiveness of the interface.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, an optical lens connector includes a flat lens and substantially flat alignment surfaces. A lens body has a planar or flat surface, and an optical lens is disposed in the lens body. The lens is a GRIN (gradient index) lens with a flat optical surface through which a light signal is propagated. The flat surface of the optical lens allows for better alignment in interfacing. The flat surface can also reduce contamination on the lens, as well as making it easier to clean than curved lenses.

Additionally, a sleeve can provide a guiding surface for the lens body to help in alignment. The sleeve surrounds the lens body, and can thus provide a more accurate and more secure alignment as compared to posts and holes. The improved alignment and reduced contamination can reduce signal degradation in the optical interconnection. The inclusion of a spring that applies a force to push the lens body toward an interfacing edge of the sleeve. The spring action allows the lens body to retract within the sleeve when interfacing with the receptacle, while allowing the lens surface to be exposed when disconnected. Current plug designs with optical interfaces have a retracted optical lens, which is virtually inaccessible for cleaning, and with the optical lens located at the back of an interface cavity where contaminants are more likely to collect.

Figure 1A:
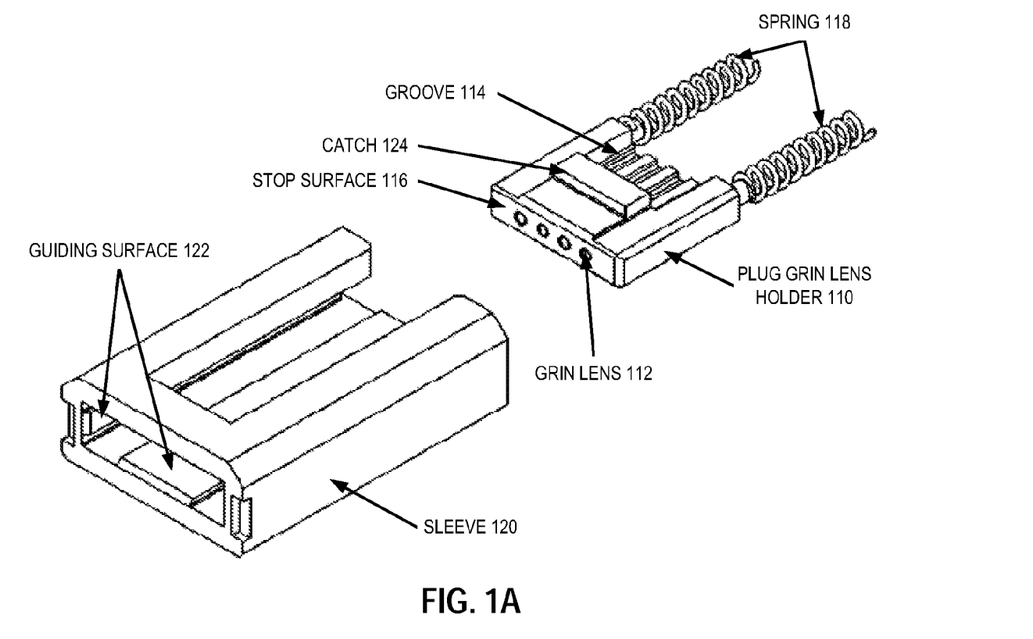
FIGS. 1A-1C illustrate block diagrams of an embodiment of a plug assembly with an optical lens connector having flat or planar surfaces for interconnection, including a lens with a flat optical surface.
Figure 1B:
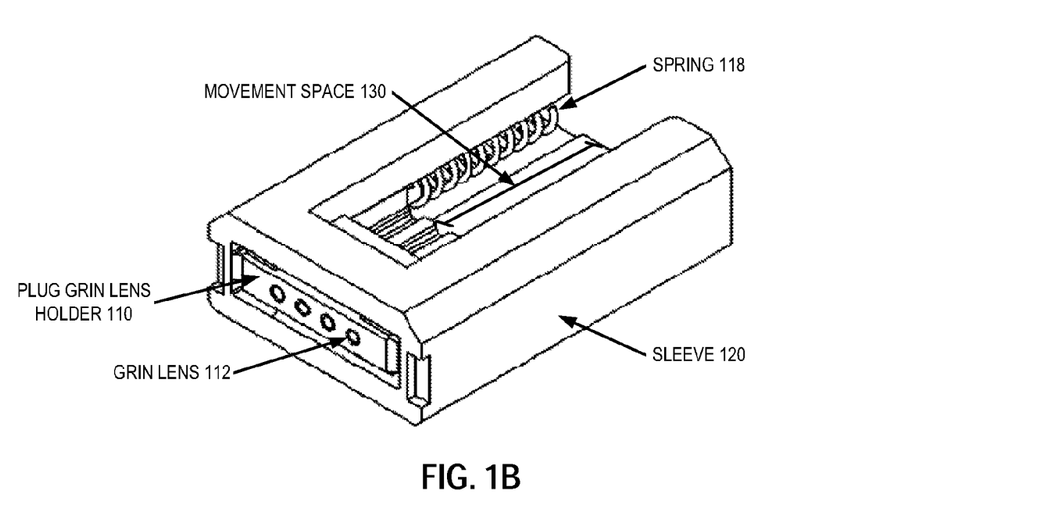
Figure 1C:
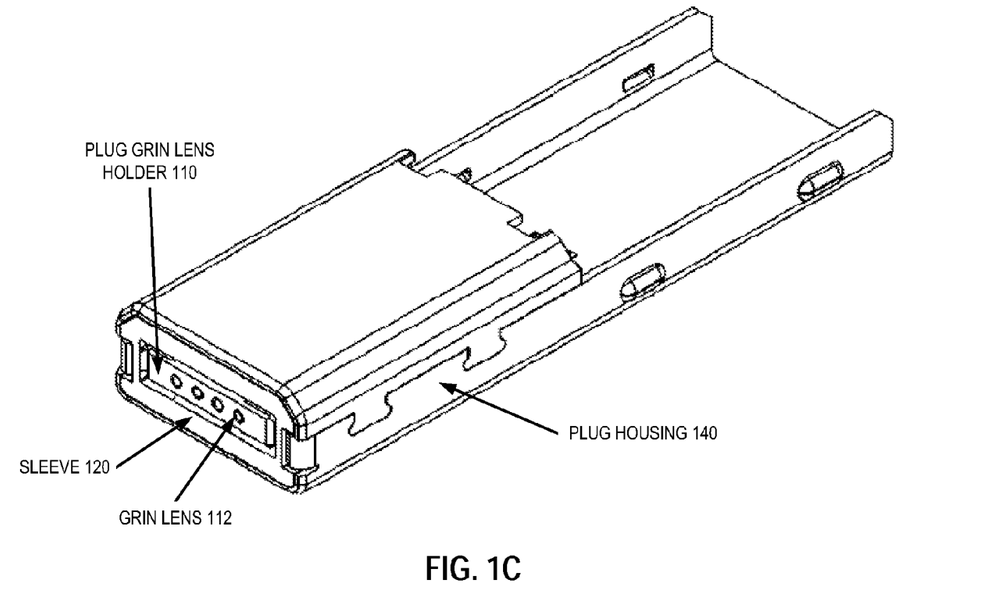

FIGS. 1A-1C illustrate block diagrams of an embodiment of a plug assembly with an optical lens connector having flat or planar surfaces for interconnection, including a lens with a flat optical surface. In one embodiment, the plug assembly includes one or more GRIN lenses 112 and plug GRIN lens holder 110 with a flat interfacing surface (stop surface 116). GRIN lens holder 110 could also be referred to herein as a lens body, and reference herein to a lens body could include the example GRIN lens holders shown. Referring to FIG. 1A, in one embodiment, such as shown, essentially every surface of GRIN lens holder 110 is flat or substantially flat (or planar). Thus, GRIN lens holder 110 can have a substantially rectangular cross-section.

In one embodiment, GRIN lens holder 110 is inserted into sleeve 120, which holds the lens body to interface it to a mating connector. In one embodiment, sleeve 120 includes one or more guiding surfaces 122 to guide alignment of GRIN lens holder 110 to the mating connector for optical interconnection. Guiding surfaces 122 can enable sleeve 120 to restrict or constrain movement of GRIN lens holder 110 in two dimensions, while allowing movement in the third dimension. The dimensional axis along which GRIN lens holder 110 can move is the axis in the same direction as the direction of light signal propagation of the optical signal through GRIN lens 112.

In one embodiment, GRIN lens holder 110 includes catch 124 to stop motion of the GRIN lens holder by catching on the body of sleeve 120. As illustrated, sleeve 120 includes an opening or channel in the top surface that generally allows movement of GRIN lens holder 110 by not restricting the motion of catch 124. Near the interfacing edge of sleeve 120, the body of sleeve 120 blocks the open channel, thus preventing GRIN lens holder 110 from moving further through sleeve 120 by catching on catch 124.

Figure 2A:
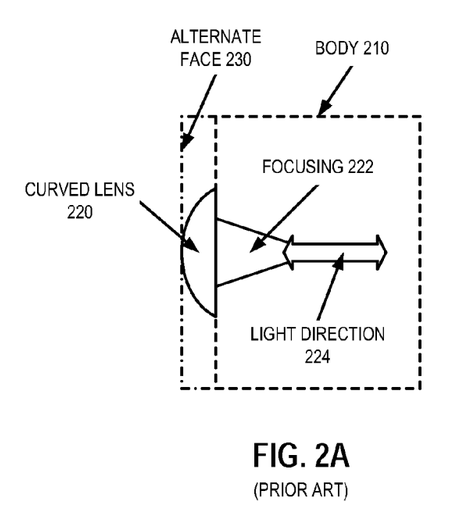
FIG. 2A is a block diagram of a prior art curved lens.
Figure 2B:
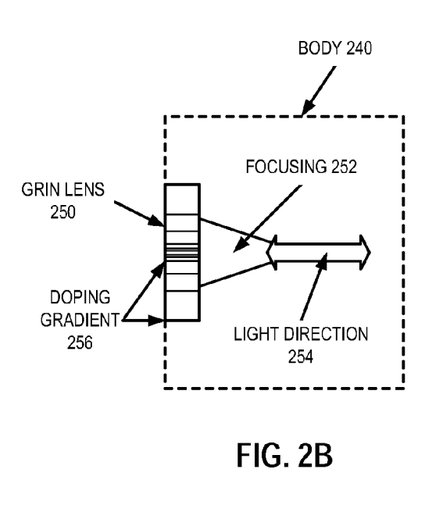
FIG. 2B is a block diagram of a GRIN lens to be used in a connector assembly with planar surfaces.

GRIN lens 112 is a GRIN lens, which has a flat interface or focusing surface instead of a rounded or curved or concave surface. See FIG. 2 below for more detail. An optical signal is propagated through GRIN lens 112 (either transmit or receive). GRIN lens 112 focuses received signals appropriately for transmission through the optical fiber, and focuses transmitted signals to an interfacing lens. Groove 114 provides structure in the lens body to receive an optical fiber. The optical fiber can rest on or in the guide of groove 114 to interface with GRIN lens 112 via an optical signal pathway through GRIN lens holder 110 between the fiber and the lens. Groove 114 can be a U-shaped groove, a V-shaped groove, or an L-shaped groove. The structure of groove 114 allows the fiber to be properly positioned and aligned with the lens for the optical fiber.

In one embodiment, the assembly includes spring 118, which exerts a force on GRIN lens holder 110 to push the lens body toward the interfacing end of sleeve 120. It will be understood that spring 118 will push against some structure not shown in FIG. 1A to cause the spring to exert force against GRIN lens holder 110. There is additional structure not shown against which the spring or springs push to push GRIN lens holder toward a mating connector.

Referring to FIG. 1B, GRIN lens holder 110 is shown inserted to the end of sleeve 120. Guiding surfaces 122 guide the lens body to the end of sleeve 120, and provide for accurate alignment of GRIN lens 112. In one embodiment, the guiding surface can be entirely flat. In another embodiment, the guiding surface has a step to partially contact with GRIN lens holder 110. The inner surfaces of sleeve 120 thus guide the movement of GRIN lens holder 110. Spring 118 pushes the lens body along the inside of sleeve 120, giving motion in one direction or one dimension, while constrained in the other dimensions. Movement space 130 shows the space in which the lens body can recede when interfacing with a mating connector (see FIGS. 3A and 3B below).

As shown in the drawings, in one embodiment, GRIN lens 112 has a flat interface or focus surface, where the flat part of the lens is parallel to stop surface 116. In one embodiment, the flat surface of GRIN lens 112 is substantially in the same plane as stop surface 116. Stop surface 116 is understood to be the interface surface of the lens body. Thus, an interfacing connector will interface by being near or in contact with stop surface 116.

Referring to FIG. 1C, GRIN lens holder 110 is positioned at the interfacing end of sleeve 120, where GRIN lens 112 can provide optical interconnection. Plug housing 140 provides a housing structure to hold sleeve 120 and the GRIN lens holder. It will be seen that plug housing 140 has space behind the area surrounding sleeve 120. In a finished assembly, that space would include structure that would allow spring 118 to push GRIN lens holder 110 forward to the interfacing end of sleeve 120. By pushing the lens body forward when the plug is not connected, GRIN lens 112 is exposed to be able to be cleaned. The lens body will then retract (or the receptacle will cause it to recede) back into sleeve 120, compressing spring 118. The compression during mating provides passive alignment by pushing the lens body along the guide rails to interface with the mating connector.

FIG. 2A is a block diagram of a prior art curved lens. In traditional lens design, curved lens 220 is disposed on body 210 to allow focusing 222 to cause an optical signal to be transmitted along light direction 224. It will be understood that focusing 222 roughly illustrates focusing for a received signal, and a transmitted signal would be expanded for transmission to another lens. In a traditional design, the curved lens could be disposed on an outer perimeter of body 210. Alternatively curved lens 220 could be disposed on an inner perimeter of body 210, with alternate face 230 being the outer perimeter of the body that would interface with another connector. The configuration on the outer perimeter of body 210 could be said to be a configuration with a protruding lens. The configuration with alternate face 230 could be said to be a configuration with a recessed lens.

FIG. 2B is a block diagram of a GRIN lens to be used in a connector assembly with planar surfaces. With GRIN lens 250, the lens is disposed in body 240, and similarly provides focusing 252 to cause an optical signal to be transmitted along light direction 254. GRIN lens 250 has doping gradient 256 to provide focusing 252. GRIN lens is doped with a chemical or material that changes optical properties of the lens material. The dopant allows for a changing index in the lens material based on radial concentration changes of the dopant. GRIN lens 250 is disposed in body 240, with the outer face of the lens being parallel with the outer surface of body 240. GRIN lens 250 can be formed and inserted into body 240, or could be formed by doping material of body 240 to create the lens.

Figure 3A:
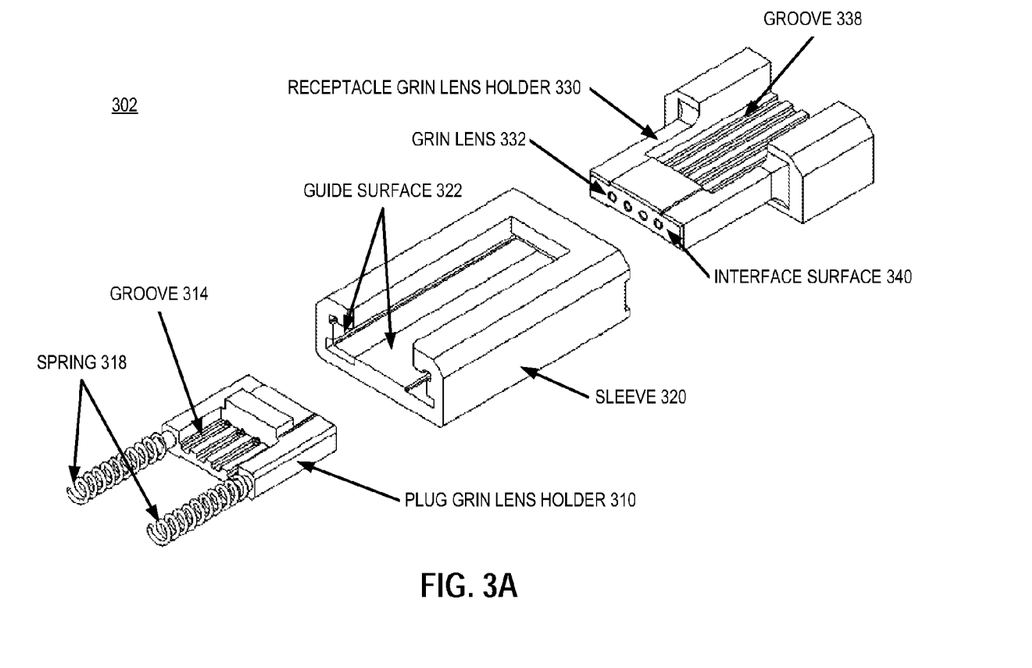
FIGS. 3A-3B illustrate block diagrams of an embodiment of flat surface interfacing between a plug and a mating receptacle.
Figure 3B:
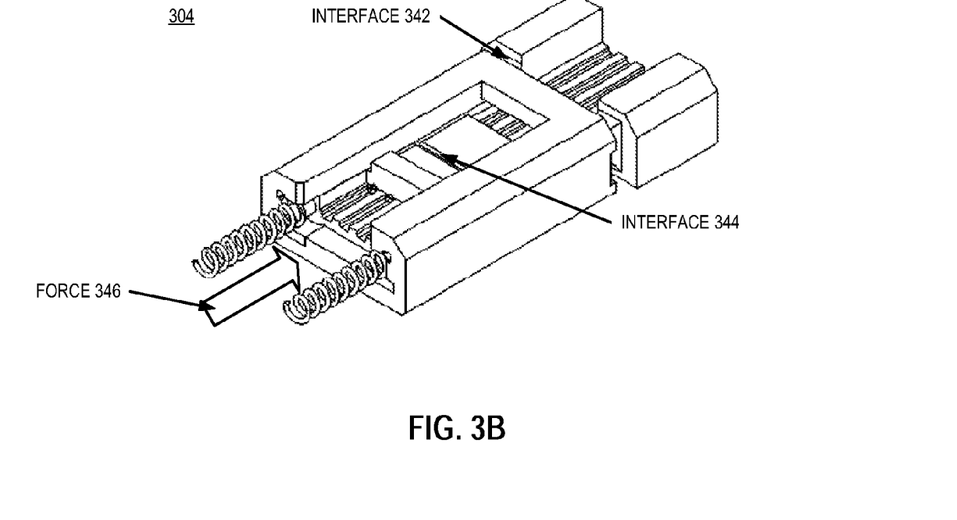

FIGS. 3A-3B illustrate block diagrams of an embodiment of flat surface interfacing between a plug and a mating receptacle. View 302 provides a view of the assembly in separated components. View 304 provides a view of the assembly with the components mated.

Referring to FIG. 3A, plug GRIN lens holder 310 is similar to plug GRIN lens holder 110 discussed above. Plug GRIN lens holder 310 includes one or more GRIN lenses (not seen), on a flat interface surface that is oriented toward the receptacle GRIN lens holder. Groove 314 in plug GRIN lens holder 310 receives an optical fiber and aligns it with a corresponding GRIN lens.

Sleeve 320 receives plug GRIN lens holder 310 from an end opposite the end that interfaces with the receptacle. Guide surfaces 322 on the inside of sleeve 320 passively align the optical interconnection by directing plug GRIN lens holder 310 to the right position for its one or more GRIN lenses to interface with one or more GRIN lens 332 of receptacle GRIN lens holder 330. It will be seen that the interfacing part of receptacle GRIN lens holder 330 matches in size and basic shape to that of plug GRIN lens holder 310. Thus, receptacle GRIN lens holder 330 can fit into sleeve 320 from the interfacing end.

Receptacle GRIN lens holder 330 includes a guide or groove 338 for the fiber corresponding to each GRIN lens 332 in the receptacle lens body. In one embodiment, interface surface 340 is a flat surface as shown. It will be understood that if the receptacle and plug interfaces were appropriately spaced, the two interfaces would not need to both have GRIN lenses. For example, one side could have a GRIN lens, and the other have a more traditional curved lens. However, interfacing may improve by having both interface surfaces of the receptacle and plug as flat or planar surfaces.

With flat interface surfaces, receptacle interface surface 340 pushes plug GRIN lens holder 310 backward when interfacing. Sleeve 320 moves forward to engage with receptacle GRIN lens holder 330, and guiding surface 322 starts to contact with receptacle GRIN lens holder 330.

Referring to FIG. 3B, sleeve 320 moves until the plug stops. Interface 342 illustrates the interface of the mated plug and receptacle at the interfacing end of sleeve 320. Structure of receptacle GRIN lens holder 330 stops against the face of sleeve 320. Interface 344 illustrates the interface at the GRIN lenses. GRIN lens 332 of receptacle GRIN lens holder 330 is adjacent to a corresponding GRIN lens of plug GRIN lens holder 310. In the case that one of the connectors uses a lens other than a GRIN lens, structure at the stop surface or interface surface of one or both connectors would be used to space the connectors for focusing the light between the lenses of the two connectors. As shown, adjacent can mean as close as touching or nearly touching.

Spring 318 compresses as receptacle GRIN lens holder 330 pushes against plug GRIN lens holder 310 in sleeve 320. As the spring compresses, force 346 is applied in the direction indicated by the arrow, pushing plug GRIN lens holder 310 toward receptacle GRIN lens holder 330. Thus, constant interaction between the plug and receptacle occurs during the interfacing, and plug GRIN lens holder 310 would be pushed back out to the interfacing end of sleeve 320 when the plug was retracted from receptacle GRIN lens holder 330.

Figure 4A:
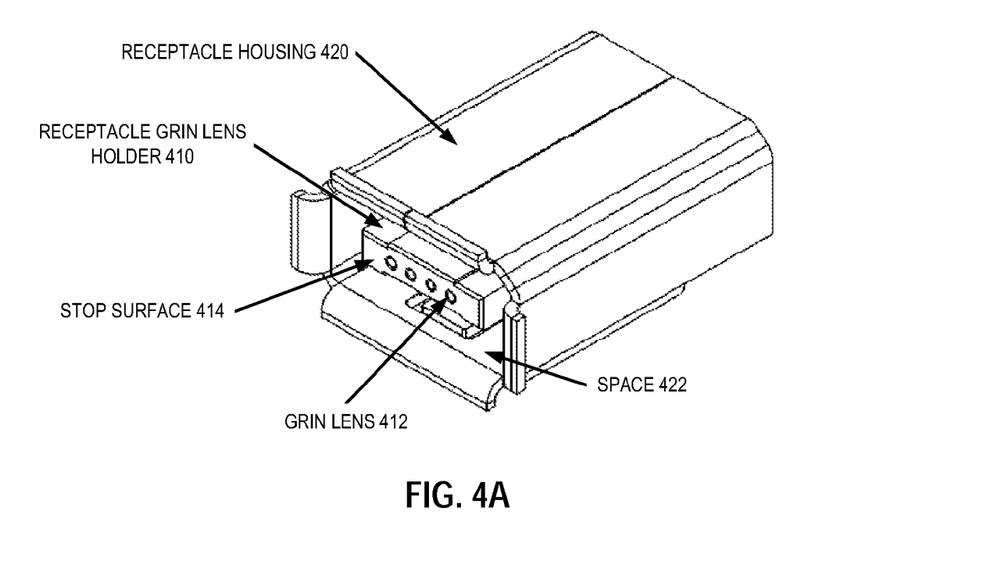
FIGS. 4A-4B illustrate block diagrams of an embodiment of flat surface interfacing at a receptacle.
Figure 4B:
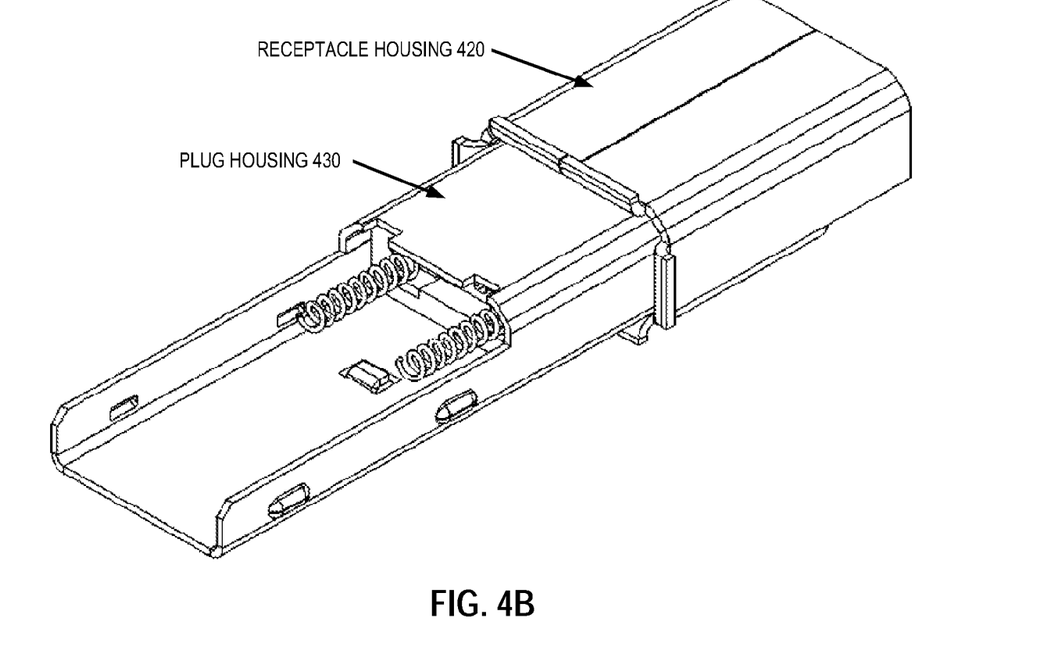

FIGS. 4A-4B illustrate block diagrams of an embodiment of flat surface interfacing at a receptacle. There is explanation above about the interfacing of the plug with the receptacle. The disclosure here provides more detail as to an embodiment of finished assemblies of the plug and receptacle.

Referring to FIG. 4A, receptacle GRIN lens holder 410 is disposed in receptacle housing 420. Receptacle housing 420 may be, for example, sheet metal housing. Other material other than sheet metal could be used to provide receptacle housing 420. There is space 422 surrounding receptacle GRIN lens holder 410 enclosed by receptacle housing 420. Space 422 is of such a size to allow the plug to interface securely. Receptacle GRIN lens holder 410 includes GRIN lens 412, and an interface surface referred to as stop surface 414.

Referring to FIG. 4B, the plug is inserted into receptacle housing 420 to interface a lens of the plug with GRIN lens 412 of the receptacle. Details regarding the interfacing of the plug and receptacle lens portions are disclosed above with reference to FIGS. 3A and 3B. The plug shown in FIG. 4B includes plug housing 430 surrounding the plug assembly. Plug housing 430 may be, for example, sheet metal housing. Other material other than sheet metal could be used to provide plug housing 430.

As shown, the receptacle is a fixed body, and the plug has a movable GRIN lens holder with corresponding sleeve and spring. In one embodiment, the plug is a fixed body (like receptacle GRIN lens holder 330 of FIG. 3A), and the receptacle has a movable GRIN lens holder (like plug GRIN lens holder 310 of FIG. 3A). Thus, it will be understood that either the plug or the receptacle will have a movable GRIN lens holder. In one embodiment, both the receptacle and the plug could have movable GRIN lens holders. In one embodiment, one of the two can be fixed while the other is movable. It is also possible to interface two fixed connectors with the flat surfaces and sleeves, but there may be a disadvantage in not being able to access the lens surface of one of the connectors.

While reference is made above to specific embodiments illustrated, a more general discussion follows without specific reference to figures. It will be understood that the flat or planar surfaces described have advantages over the traditional use of holes and pins. The manufacture and/or machining of the posts or pins resulted in undesirable variations due to the difficulty of maintaining tolerance of size and position. Additionally, rounded components introduced the difficulty of tapering, which introduces another dimension of tolerance that must be kept.

In contrast, the described embodiments use flat surfaces. With such surfaces, there is only dimensional tolerance to deal with, rather than dimension, position, and possibly tapering. Thus, potentially multiple dimensions of tolerance can be eliminated. The flat or planar surfaces provide an advantage in interfacing via passive alignment to provide a better optical interconnection. Additionally, flat surfaces, including when the focal part of the lens is flat allows for easier cleaning of the lens than traditional rounded lenses. Thus, in addition to the benefits of more controlled optical alignment, the effects of contamination can be reduced by removing the contamination.

As used herein, line of focus and direction of propagation refer to a direction that an optical signal is generally propagated when transferred. Line of focus can refer to a hypothetical line that would extend through and out both directions of the lens based on the focus of the lens. For example, a direction of propagation of an optical signal through a fiber is down the length of the fiber, and orthogonal to a cross section circle of the fiber. A direction of propagation with reference to an optical lens refers to how light generally passes through the lens. With reference to a lens, the direction of propagation can also be referred to as a line of focus, referring to the focusing of the optical signal by the lens. The line of focus is generally orthogonal to a lens surface on which an optical lens is disposed.

An optical lens is referred to above with respect to the lens body. It will be understood that a lens can be constructed of any appropriate material, which can include plastic, glass, silicon, or other materials that can be shaped and provide optical focusing. The lens body can include multiple materials, with at least an optical surface being of an appropriate material to direct or redirect light propagation.

Currently, plastic lenses are a common choice, seeing they provide convenience in cost, manufacturing, and durability. In one embodiment, the optical lens is designed to support expanded-beam optical interfacing. In an expanded-beam approach, the optical lens expands and collimates transmit signals, and focuses received signals. As is understood by those skilled in the art, collimating refers to making the photons of the light signal more parallel in reception.

Discussion herein of mating one connector with another refers to providing a mechanical and communicative connection. The mating of one connector with another typically also provides a communication connection. The mating of the connectors occurs via the housing and alignment features, and typically includes contact of the electrical contacts and/or alignment of fiber optical signal transmission elements.

The various assemblies described herein could each also be referred to as a "subassembly." A technical distinction could be drawn between an assembly and a subassembly. For example, an assembly could refer to a "finished" product, or a finished system or subsystem of a manufactured item, while a subassembly could refer to a combination of components to be combined with other components or another subassembly to complete an assembly. However, a subassembly is not distinguished from an 'assembly' herein, and use of the different terms is solely for convenience in description. Reference to an assembly can refer to what can otherwise be considered a subassembly, and both refer to an integration or combination of components.

The electrical protocols or standards that can be used could include universal serial bus (USB) (standard or mini), high-definition multimedia interface (HDMI), DisplayPort (including MiniDisplayPort (MDP)). It will be understood that each different standard can include a different configuration or pinout for the electrical contact assembly. Additionally, the size, shape and configuration of the contact housing are dependent on the standard, including tolerances for the mating of the corresponding connectors. Thus, the layout of a connector can be different for the various standards. As will be understood by those of skill in the art, optical interfaces require line-of-sight connections to have an optical signal transmitter interface with a receiver (such as a lens and a fiber, or two lenses).

Figure 5:
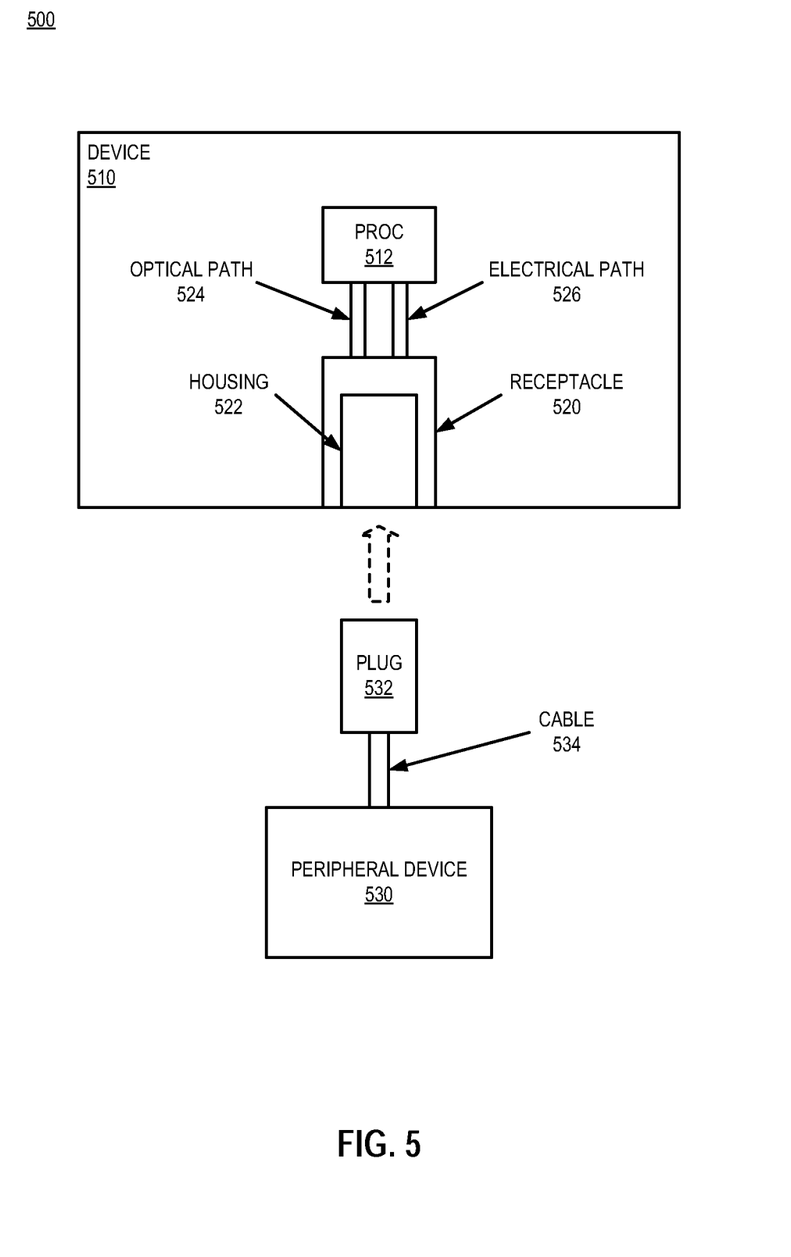
FIG. 5 is a block diagram of an embodiment of a system in which flat surface interface connectors could be used.

FIG. 5 is a block diagram of an embodiment of a system in which an active optical cable assembly could be used. System 500 includes device 510, which can include any of a number of devices, including a desktop or laptop computer, a netbook, a tablet computing device, or other such device. Besides computing devices, it will be understood that many other types of electronic devices can incorporate the one or more of the types of connector discussed herein, and the embodiments described herein would apply equally well in such electronic devices. Examples of other such electronic devices can include handheld devices, smartphones, media devices, multimedia devices, memory devices, cameras, voice recorders, I/O devices, networking devices, gaining devices, gaming consoles, or any other electronic device that might include such a connector.

Device 510 includes processor (roc) 512, which represents any type of processing component that processes electrical and/or optical signals I/O signals. Processor 512 is an abstraction, and it will be understood that a single processing device could be used, including a multi-core device, or multiple separate devices can be used. Processor 512 can include or be a microprocessor, programmable logic device or array, microcontroller, signal processor, or some combination.

Device 510 includes receptacle 520, which interfaces with plug 532. Plug 532 is a connector plug that allows peripheral device 530 (which can be any of the same types of devices discussed above) to interconnect with device 510. Plug 532 can be directly built into peripheral device 530 (with or without a cord or cable), or can be interconnected to peripheral device 530 via a standalone cable. In one embodiment, plug 532 supports communication via an optical interface, an electrical interface, or both.

Plug 532 mates with receptacle 520 of device 510. As used herein, mating one connector with another refers to providing a mechanical connection. The mating of one connector with another typically also provides a communication connection. Receptacle 520 includes housing 522, which provides the mechanical connection mechanisms. In one embodiment, receptacle 520 includes electrical and optical interface components. In one embodiment, receptacle 520 only supports an optical interface.

Device 510 includes optical path 524 to support the optical interfacing. Optical path 524 represents one or more components, which can include processing and/or termination components that convey an optical signal between processor 512 and receptacle 520. Conveying a signal can include the generation and converting to optical, or the receiving and converting to electrical, as described in more detail below. In an embodiment where electrical interfacing from receptacle 520 is supported in device 510, device 510 includes electrical path 526. Electrical path 526 represents one or more components that convey an electrical signal between processor 512 and receptacle 520.

It will be understood that while a portion of optical path 524 can include electrical components (especially for converting to/from electrical for processor 512), optical path 524 conveys a signal that is either received at or sent from device 510 as an optical signal. In contrast, electrical path 526 conveys a signal that is either received at or sent from device 510 as an electrical signal. Thus, optical path 524 provides a communication path for receptacle 520 as an optical interface, and electrical path 526 provides a communication path for receptacle 520 as an electrical interface.

Receptacle 520, housing 522, and optical and electrical paths (524 and 526, respectively) support the connector embodiments described above. In one embodiment, plug 532 includes an active optical connector (AOC) assembly. The AOC assembly includes interfaces between an optical connector including an optical lens, and a jumper connector including an optical fiber.

In one embodiment, plug 532 is an optical plug interface, and cable 534 includes one or more optical fibers. The interfacing between the plug and receptacle is accomplished with flat-surface interconnects. In one embodiment, one or both connector includes GRIN lenses. The interfacing of plug 532 with receptacle 520 occurs as set forth above.

Figure 6:
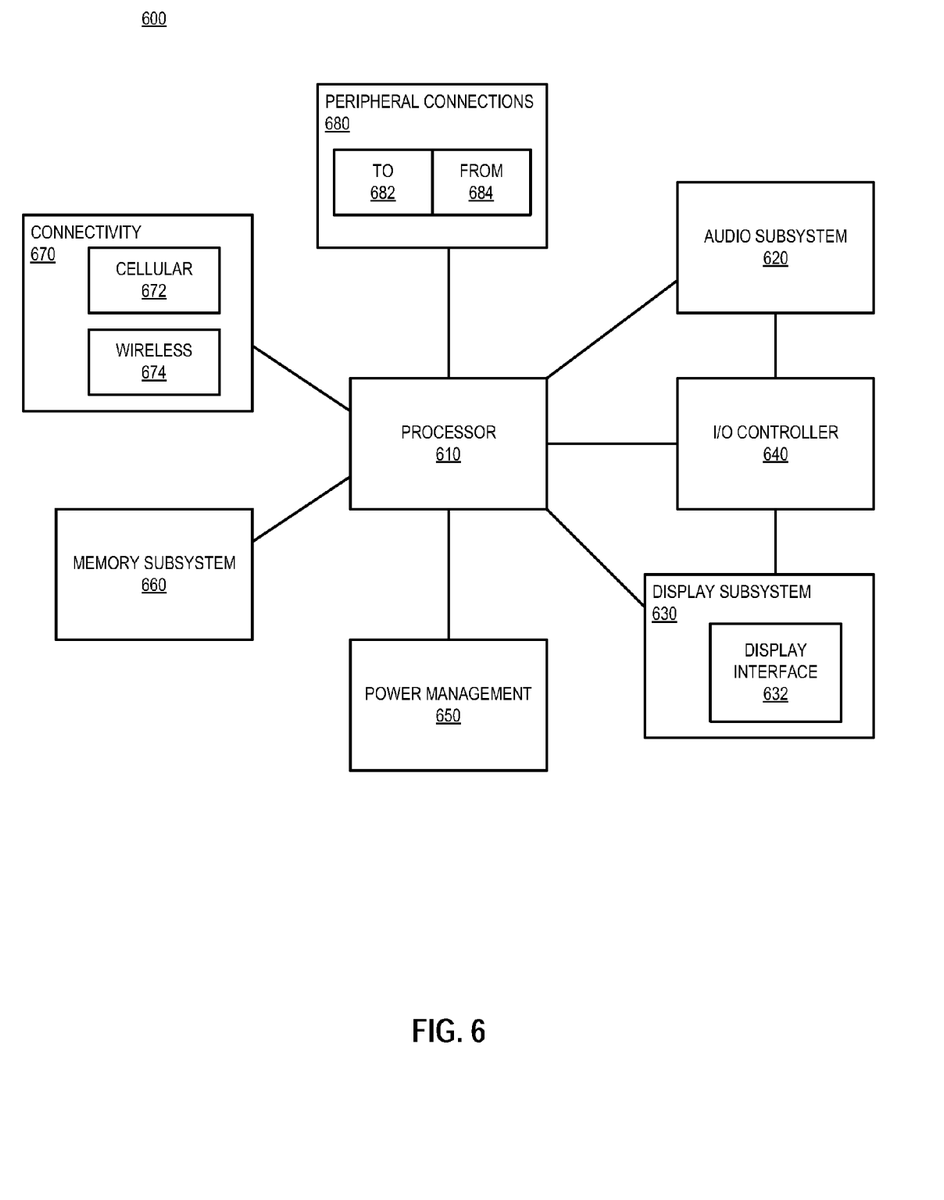
FIG. 6 is a block diagram of an embodiment of a mobile device in which flat surface interface connectors could be used.

FIG. 6 is a block diagram of an embodiment of a mobile device in which flat surface interface connectors could be used. Computing device 600 represents a mobile computing device, such as a computing tablet, a mobile phone or smartphone, a wireless-enabled e-reader, or other wireless mobile device. It will be understood that certain of the components are shown generally, and not all components of such a device are shown in device 600.

Device 600 includes processor 610, which performs the primary processing operations of device 600. Processor 610 can include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 600, or connected to device 600. In one embodiment, a user interacts with device 600 by providing audio commands that are received and processed by processor 610.

Display subsystem 630 represents hardware (e.g., display devices and software drivers) components that provide a visual and/or tactile display for a user to interact with the computing device. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touchscreen, the display device also acts as an input device, which can be at least partially managed by I/O controller 640. There can also be additional buttons or switches on device 600 to provide I/O functions managed by I/O controller 640.

In one embodiment, I/O controller 640 manages devices such as accelerometers, cameras, light sensors or other environmental sensors, or other hardware that can be included in device 600. The input can be part of direct user interaction, as well as providing environmental input to the system to influence its operations (such as filtering for noise, adjusting displays for brightness detection, applying a flash for a camera, or other features).

In one embodiment, device 600 includes power management 650 that manages battery power usage, charging of the battery, and features related to power saving operation. Memory subsystem 660 includes memory devices for storing information in device 600. Memory can include nonvolatile state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600.

Connectivity 670 includes hardware devices wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 674 refers to wireless connectivity that is not cellular, and can include personal area networks (such as Bluetooth), local area networks (such as WiFi), and/or wide area networks (such as WiMax), or other wireless communication.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audiovisual or other systems.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, one or more peripheral connections are established via optical interconnections. When an optical interconnection is used, an optical plug and receptacle can be used. In one embodiment, as described above, the plug and receptacle interface by flat surfaces to passively align the optical interconnection, and one or both of the connectors includes a GRIN lens that has a flat interfacing portion (as opposed to the traditional curved lenses). In one embodiment, a sleeve guides the interfacing of the plug and receptacle. In one embodiment a spring reinforces and secures the optical interfacing of the plug and receptacle.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An optical lens connector comprising:
   a lens body having a planar surface to receive an optical lens;
   an optical lens disposed in the lens body, wherein the optical lens is a GRIN (gradient index) lens comprising a flat surface, wherein a plane of the flat surface is orthogonal to a direction of light signal propagation through the optical lens, and wherein the flat surface is parallel to the planar surface of the lens body, and wherein the GRIN lens has a dopant concentration that changes radially along the flat surface to focus the light signal through an optical pathway to an optical fiber;
   a sleeve with connector guides to constrain movement of the optical lens body in two dimensions, and
   a spring to exert a force on the lens body, wherein the spring is to move the optical lens body inside the sleeve along the direction of light signal propagation toward a mating connector.

2. The optical lens connector of claim 1, wherein the flat surface of the lens is substantially in the same plane as the planar surface.

3. The optical lens connector of claim 1, wherein all surfaces of the lens body are generally planar to interface with mating planar surfaces of a mating connector.

4. The optical lens connector of claim 1, wherein the optical lens is to interface with a corresponding flat optical lens of a mating connector.

5. An optical plug assembly comprising:
   a plug body portion having a flat interface surface to interface with a receptacle connector; and
   an optical lens disposed in the plug body portion, wherein the optical lens is a GRIN (gradient index) lens comprising a flat surface orthogonal to a direction of light signal propagation through the optical lens, wherein the flat surface is parallel to the flat interface surface of the plug body portion, and wherein the GRIN lens has a dopant concentration that changes radially along the flat surface to focus the light signal through an optical pathway to an optical fiber;
   a sleeve with interior guide surfaces to receive the plug body portion and to constrain movement of the plug body portion in two dimensions, and
   a spring to exert a force on the plug body portion, wherein the spring is to move the plug body portion inside the sleeve along the direction of light signal propagation toward the receptacle connector.

6. The optical plug assembly of claim 5, wherein the flat surface of the lens is substantially in the same plane as the flat interface surface.

7. The optical plug assembly of claim 5, wherein the plug body portion has a substantially rectangular cross section for a cross section parallel to the flat interface surface.

8. The optical plug assembly of claim 5, wherein the optical lens is to interface with a corresponding flat optical lens of the receptacle connector.

9. The optical plug assembly of claim 5, wherein the plug body portion further comprises:
   a channel for a groove behind the optical lens to receive and guide an optical fiber to the optical lens.

10. A receptacle assembly comprising:
    a body portion having a flat interface surface to interface with a plug connector; and
    an optical lens disposed in the body portion, wherein the optical lens is a GRIN (gradient index) lens comprising a flat surface orthogonal to a direction of light signal propagation through the optical lens, and parallel to the flat interface surface of the body portion, and wherein the GRIN lens has a dopant concentration that changes radially along the flat surface to focus the light signal through an optical pathway to an optical fiber;
    a sheet metal housing to surround a sleeve of the plug connector when the plug connector and the receptacle assembly are interfaced together, the sleeve comprising connector guides to constrain movement of the plug connector in two dimensions, wherein a spring is to exert a force on the plug connector, wherein the spring is to move the plug connector inside the sleeve along the direction of light signal propagation toward the flat interface surface of the body portion.

11. The receptacle assembly of claim 10,
    wherein the flat interface surface of the body portion is to interface with a mating flat interface surface of the plug connector.

12. The receptacle assembly of claim 11, wherein the body portion of the receptacle assembly has a fixed position in the receptacle assembly, the body portion of the receptacle assembly to cause a body portion of the plug connector to recede into the sleeve of the plug connector.

* * * * *